May 20, 1952     T. KAHAN     2,597,149

ULTRAHIGH-FREQUENCY MAGNETOMETER

Filed March 29, 1949     3 Sheets-Sheet 1

Fig:1

Inventor
T. Kahan
By
Wenderoth, Lind & Ponack
Attorneys

May 20, 1952  T. KAHAN  2,597,149
ULTRAHIGH-FREQUENCY MAGNETOMETER

Filed March 29, 1949  3 Sheets—Sheet 3

Inventor
T. Kahan
By
Wenderoth, Lind & Ponack
Attorneys

Patented May 20, 1952

2,597,149

UNITED STATES PATENT OFFICE 2,597,149

ULTRAHIGH-FREQUENCY MAGNETOMETER

Theodore Kahan, Paris, France, assignor to Office National d'Etudes et de Recherches Aéronautiques, Paris, France, a corporate body of France Application March 29, 1949, Serial No. 84,067
In France August 5, 1948

3 Claims. (Cl. 175—183)

1

Numerous types of magnetometers are known of which the more generally used are the so-called reluctance magnetometers and the second harmonic magnetometers. Now the former do not show a linear response and give no zero indication for a zero magnetic field, the indication passing then merely through a minimum. It is therefore necessary to take into account all the drawbacks of compensation. Magnetometers of the second harmonic type show also a series of drawbacks. They are always complicated and are also not linear. They have moreover a residual voltage that is not zero. They are furthermore disturbed by numerous parasitic influences such as the passage of the feed frequency through parasitic capacities and couplings and the like. Furthermore their feeding through a non sinusoidal current is difficult to execute.

The present invention has for its object an ultra high frequency magnetometer that removes such drawbacks and shows furthermore improved qualities of stability and sensitivity.

According to a first feature of my invention, the improved magnetometer includes in combination a wave guide fed through a generator of ultra high frequency, said guide being tuned by means of a tuning piston, a bar of magnetic material or a bar coated with a ferromagnetic substance that is engaged partly in the magnetic field to be measured and partly in the guide and probing means proper to detect a current that depends on the coefficient of reflection of the waves on the bar, that is on the magnetic permeability of said bar and consequently on the magnetic field to be measured and acting on said bar.

According to a further feature of the invention and when it is desired to remove the errors due to the variations occurring in the feeding means and generator, the magnetometer includes two identical guides fed by the same ultra high frequency generator and tuned each by a tuning plunger while two conductive rods or bars of similar configuration are provided of which only one is coated with a ferro-magnetic substance, said bars being partly engaged to a similar extent in one of the guides, and two identical similarly located probing means are carried each in a guide and are connected in opposed relationship with an indicating instrument sensitive to the resulting detected current.

According to a still further feature of the invention, it is possible to eliminate the effect of a dissymmetric arrangement of the probes and plungers by providing a magnetometer including

2 a guide section closed at both ends and energized in its middle, an auxiliary guide section arranged in shunt relationship while conductive rods or bars partly engaging the first guide section and similarly located with reference to the ends of said guide with the rod or rods adjacent only to one of said ends being coated with a ferro-magnetic substance, a detecting probe connected through the agency of a guide section being connected in series with the middle of the first section.

I will now describe in detail the general principle and two preferred embodiments of said invention by way of exemplification, reference being made to accompanying drawings, wherein.

Figure 1:
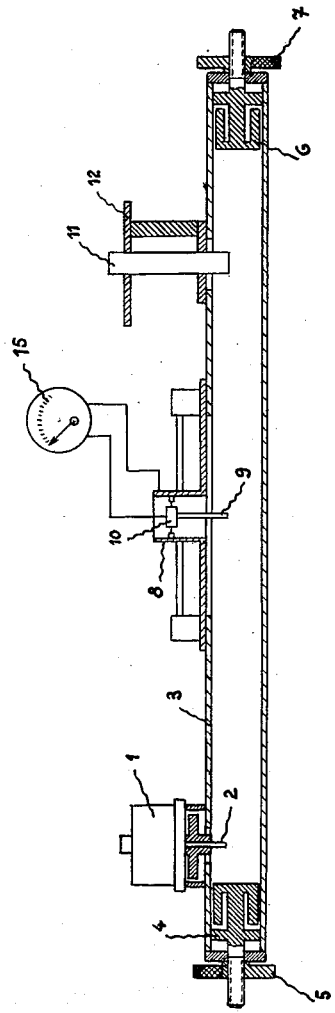
Fig. 1 represents a simple embodiment of an ultra high frequency magnetometer corresponding to my invention.

Turning to Fig. 1 that shows an illustration of the simplest embodiment of the invention and allows its principle to be readily ascertained, it is apparent that said principle consists in resorting to the variations in the magnetic permeability of a ferro-magnetic material engaging the magnetic field to be measured, said variations acting on the coefficient of reflection of an ultra-high frequency wave on a bar or rod made of said material.

In Figure 1, I designates an ultra high frequency generator, for instance a reflex klystron working on 9.375 mc./s. and having a coaxial output lead 2.

This generator feeds a guide 3 working in the $TE_{10}$ mode, the transition means being constituted by a plunger of the choke type 4 controlled by a knurled head knob 5.

The guide terminates in a tuning plunger 6 controlled by a knob 7 which is identical with the plunger 4.

A voltage standing wave ratio-meter is represented at 8, and comprises a probe 9 and a crystal detector 10.

The coefficient of reflection of an ultra high frequency wave on the bar 11 made of magnetic material is dependent on the permeability of the bar, i. e. on the magnetic field H into which is placed the portion of the bar 11 emerging from the guide 3.

12 designates a plate on which can be eventually placed a coil.

A gauge 15 measures the current detected by the crystal 10, which current is dependent on the magnetic field H to be measured.

Figure 2:
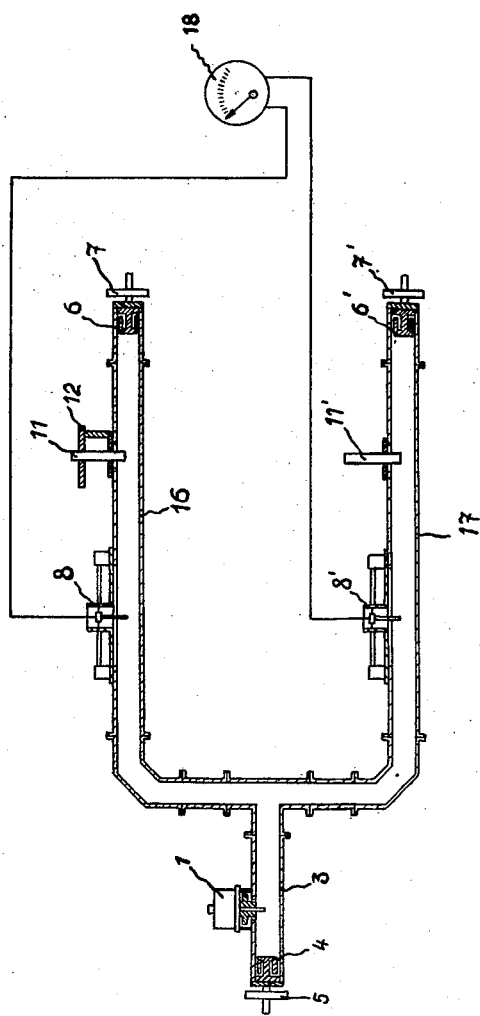
Fig. 2 illustrates a first embodiment incorporating a differential connection.

The errors due to variations of the feeding and of the generator can be eliminated by making use of two guides 16 and 17, according to Figure 2, working in the $TE_{10}$ mode and fed by the same generator 1.

4 is a plunger of the choke type controlling the transition between the klystron's R. F. output probe and the guide.

6 and 6' are two tuning plungers.

8 and 8' are two standing wave detectors, the two probes 9 and 9' of which are as closely identical as possible. The outputs of said detectors are connected to some measuring means such as ratio-meter 18.

The two bars 11 and 11' have the same geometrical shape and are engaged to the same depth into the guides 16 and 17 respectively. But only the bar 11 is made of or is coated with a ferromagnetic substance.

Thanks to this differential circuit arrangement, a current is detected which is a function of the magnetic field to be measured, and which is independent from the power of the generator.

Figure 3:
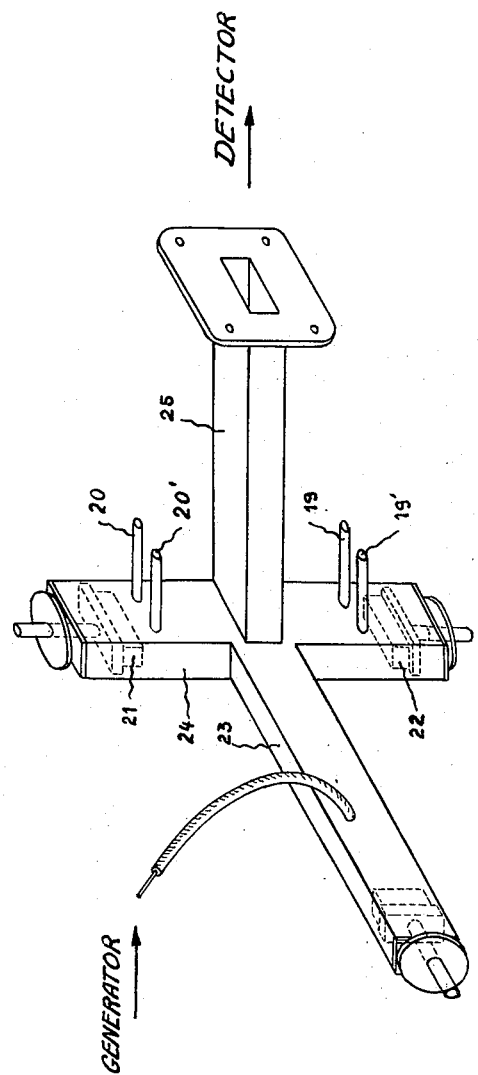
Fig. 3 illustrates a further improved embodiment of a magnetometer according to the invention, removing the different causes of errors arising in the preceding pattern.

But in a magnetometer such as shown in Figure 2, the errors due to the dissymmetric arrangement of the probes and of the plungers are not eliminated. On the contrary, due to a differential arrangement these errors are eliminated in the circuit shown in Figure 3.

24 is a section of a wave guide, ending at each end in a conductive bar or a row of conductive bars 19 and 19', 20 and 20', and in two identical plungers 21 and 22. Only at one end are the metal bars 19 and 19' coated with a ferromagnetic substance. This guide is energized at its middle by a guide section 23 in a shunt connection with the former, that is through the small side of the main guide 24. Two waves are thus generated which propagate themselves to either end of 24.

A detector which is not represented is connected by means of a guide section 25, in a serial arrangement, i. e. through the large side, with the main guide 24.

The whole arrangement acts as a magic T (see volume 16, page 262 of the "Transactions of the Massachusetts Institute of Technology"), of which 23 is an H-plane arm and 25 is an E-plane arm. This allows detecting a zero current for two identical reflections in 20—20' and in 19—19'. The detecting means may be directly gauged in field values.

What I claim is:

1. An ultra high frequency magnetometer comprising in combination a wave guide circuit, an ultra high frequency generator designed to feed said wave guide circuit, and transition means from said generator to said guide, a tuning plunger associated with said wave guide, a bar of magnetic material passing through the wall of the wave guide, its lower end being engaged in the guide and its upper part being positioned in the magnetic field to be measured, a voltage standing wave ratio-meter provided to detect a current depending on the coefficient of reflection of the wave against the bar, said coefficient of reflection depending on the magnetic permeability of the latter and consequently on the intensity of the magnetic field in which the outer end of the bar is engaged, and means for measuring said current.

2. An ultra high frequency magnetometer comprising in combination a wave guide circuit formed by one main section and by two other identical sections in a shunt connection with the former, an ultra high frequency generator designed to feed said main wave guide and the transition means from said generator to said guide, two tuning plungers associated each with one of the two identical guide sections, a bar of magnetic material passing through the wall of the first of the two identical guide sections, the lower part of this bar being engaged in the guide and its upper part being positioned in the magnetic field to be measured and having its permeability changed by said magnetic field, a bar of non-magnetic conducting material of the same shape and similarly positioned with respect to the second of the two identical guide sections as the bar of magnetic material is positioned with respect to the first section, two voltage standing wave detectors similarly positioned on one of each of the two identical guide sections and provided to detect a current depending on the coefficients of reflection of the wave respectively against the bar of magnetic and against the bar of non-magnetic conducting materials, and measuring means of ratio-meter type for measuring of the difference of said two currents.

3. An ultra high frequency magnetometer comprising in combination a wave guide circuit formed by a magic T, an ultra high frequency generator designed to feed the H-plane arm of said magic T, and transition means from said generator to said arm, two tuning plungers associated each with one end of the main arm of said magic T, a bar of magnetic material passing through the wall of one side of said main arm, the lower part of this bar being engaged in the guide and its upper part being positioned in the magnetic field to be measured and having its permeability changed by said magnetic field, a bar of non-magnetic conducting material of the same shape and similarly positioned with respect to the second branch of the main arm as the bar of magnetic material is positioned with respect to the first branch of the main arm, a voltage standing wave detector placed on the E-plane arm of the magic T and provided to detect a current depending on the coefficients of reflection of the wave respectively against the bar of magnetic and against the bar of non-magnetic conducting materials, and means for measuring said current.

THEODORE KAHAN.

REFERENCES CITED

The following references are of record in the file of this patent:

UNITED STATES PATENTS

| Number | Name | Date |
|---|---|---|
| 2,474,260 | Leef | June 28, 1949 |
| 2,477,347 | Posey | July 26, 1949 |
| 2,481,993 | Fuss | Sept. 13, 1949 |